(12) United States Patent
Kinoshita

(10) Patent No.: US 11,760,279 B2
(45) Date of Patent: Sep. 19, 2023

(54) CLAMP AND CLAMP-EQUIPPED WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Hirohito Kinoshita, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 277 days.

(21) Appl. No.: 17/417,015

(22) PCT Filed: Oct. 4, 2019

(86) PCT No.: PCT/JP2019/039339
§ 371 (c)(1),
(2) Date: Jun. 21, 2021

(87) PCT Pub. No.: WO2020/137074
PCT Pub. Date: Jul. 2, 2020

(65) Prior Publication Data
US 2022/0073015 A1 Mar. 10, 2022

(30) Foreign Application Priority Data
Dec. 25, 2018 (JP) ................................. 2018-240850

(51) Int. Cl.
*F16B 2/08* (2006.01)
*F16F 15/04* (2006.01)
(Continued)

(52) U.S. Cl.
CPC ............ *B60R 16/0215* (2013.01); *F16B 2/08* (2013.01); *F16F 3/0873* (2013.01); *F16F 15/04* (2013.01);
(Continued)

(58) Field of Classification Search
CPC ...... B60R 16/0215; F16B 2/08; F16F 3/0873; F16F 15/04; F16F 2234/02; F16L 3/12; H02G 3/32
(Continued)

(56) References Cited

U.S. PATENT DOCUMENTS 7,219,931 B2 * 5/2007 Kato ......................... F16L 3/13
248/74.2
7,887,012 B2 * 2/2011 Desai .................... F16L 3/1075
248/68.1
(Continued)

FOREIGN PATENT DOCUMENTS

JP  H09-303621 A  11/1997
JP  2003-120862 A  4/2003
(Continued)

OTHER PUBLICATIONS

Dec. 17, 2019 International Search Report issued in International Patent Application No. PCT/JP2019/039339.

*Primary Examiner* — Timothy J Thompson
*Assistant Examiner* — Michael F McAllister
(74) *Attorney, Agent, or Firm* — Oliff PLC

(57) ABSTRACT

A clamp including: a holding portion configured to hold a wire harness; and a fixing portion that is provided in a portion of an outer circumferential surface of the holding portion and is to be fixed to a fixed portion; wherein the fixing portion includes: a base that includes a first surface that faces a holding portion side and a second surface located opposite to the first surface, a support shaft that extends from
(Continued)

the second surface of the base in a direction away from the holding portion, a lock that is provided at a leading end of the support shaft and is formed to be able to be locked to the fixed portion, and a vibration suppressor that is made of a material whose elastic modulus is lower than that of the base and protrudes from the second surface of the base toward a lock side.

10 Claims, 6 Drawing Sheets

(51) Int. Cl.
  *F16L 3/12* (2006.01)
  *H02G 3/32* (2006.01)
  *B60R 16/02* (2006.01)
  *F16F 3/087* (2006.01)
(52) U.S. Cl.
  CPC .................. *F16L 3/12* (2013.01); *H02G 3/32* (2013.01); *F16F 2224/0241* (2013.01); *F16F 2234/02* (2013.01)

(58) Field of Classification Search
  USPC ........................................................ 174/72 A
  See application file for complete search history.

(56) References Cited

U.S. PATENT DOCUMENTS

| 2005/0098688 | A1 | 5/2005 | Miarka et al. | |
|---|---|---|---|---|
| 2010/0084520 | A1* | 4/2010 | Ohno | B60N 2/72 |
| | | | | 248/74.1 |
| 2017/0219126 | A1* | 8/2017 | Kato | B60R 16/08 |

FOREIGN PATENT DOCUMENTS

| JP | 2005-172229 A | 6/2005 |
|---|---|---|
| JP | 2009-068515 A | 4/2009 |
| JP | 2010-173400 A | 8/2010 |
| JP | 2015-082870 A | 4/2015 |

* cited by examiner

CLAMP AND CLAMP-EQUIPPED WIRE HARNESS

BACKGROUND

The present disclosure relates to a clamp and a clamp-equipped wire harness.

Conventionally, various clamps for fixing a wire harness to a fixed portion such as a vehicle body have been proposed (see JP 2015-82870A, for example). A clamp of this type has a holding portion for holding a wire harness and a fixing portion to be fixed to a vehicle body. The fixing portion includes a support shaft whose base end is connected to the holding portion, a locking portion that is formed at a leading end of the support shaft and is locked to the vehicle body, and a pair of coil springs that are provided on two sides with the support shaft interposed therebetween. Impact transmitted from the vehicle body to the wire harness via the clamp is absorbed by the pair of coil springs disposed in the surrounding region of the support shaft.

SUMMARY

However, there is still room for improvement in that, with the above-described clamp, a coil spring repeats simple vibration accompanying vibration of the vehicle body, and thus it is difficult to dampen vibration.

An exemplary aspect of the disclosure provides a clamp and a clamp-equipped wire harness that are capable of dampening vibration.

A clamp according an exemplary aspect includes a holding portion configured to hold a wire harness, and a fixing portion that is provided in a portion of an outer circumferential surface of the holding portion and is to be fixed to a fixed portion, in which the fixing portion includes a base that includes a first surface that faces the holding portion side and a second surface located opposite to the first surface, a support shaft that extends from the second surface of the base in a direction away from the holding portion, a lock that is provided at a leading end of the support shaft and is formed to be able to be locked to the fixed portion, and a vibration suppressor that is made of a material whose elastic modulus is lower than that of the base and protrudes from the second surface of the base toward a lock side.

A clamp and a clamp-equipped wire harness according to the present disclosure achieve the effect of being able to dampen vibration.

DETAILED DESCRIPTION OF EMBODIMENTS

The following describes an embodiment with reference to the accompanying drawings. Note that, in the accompanying drawings, some of the components may be exaggerated or simplified for the sake of description. Also, the dimensional ratio of some parts may differ from their actual ratio.

Figure 1:
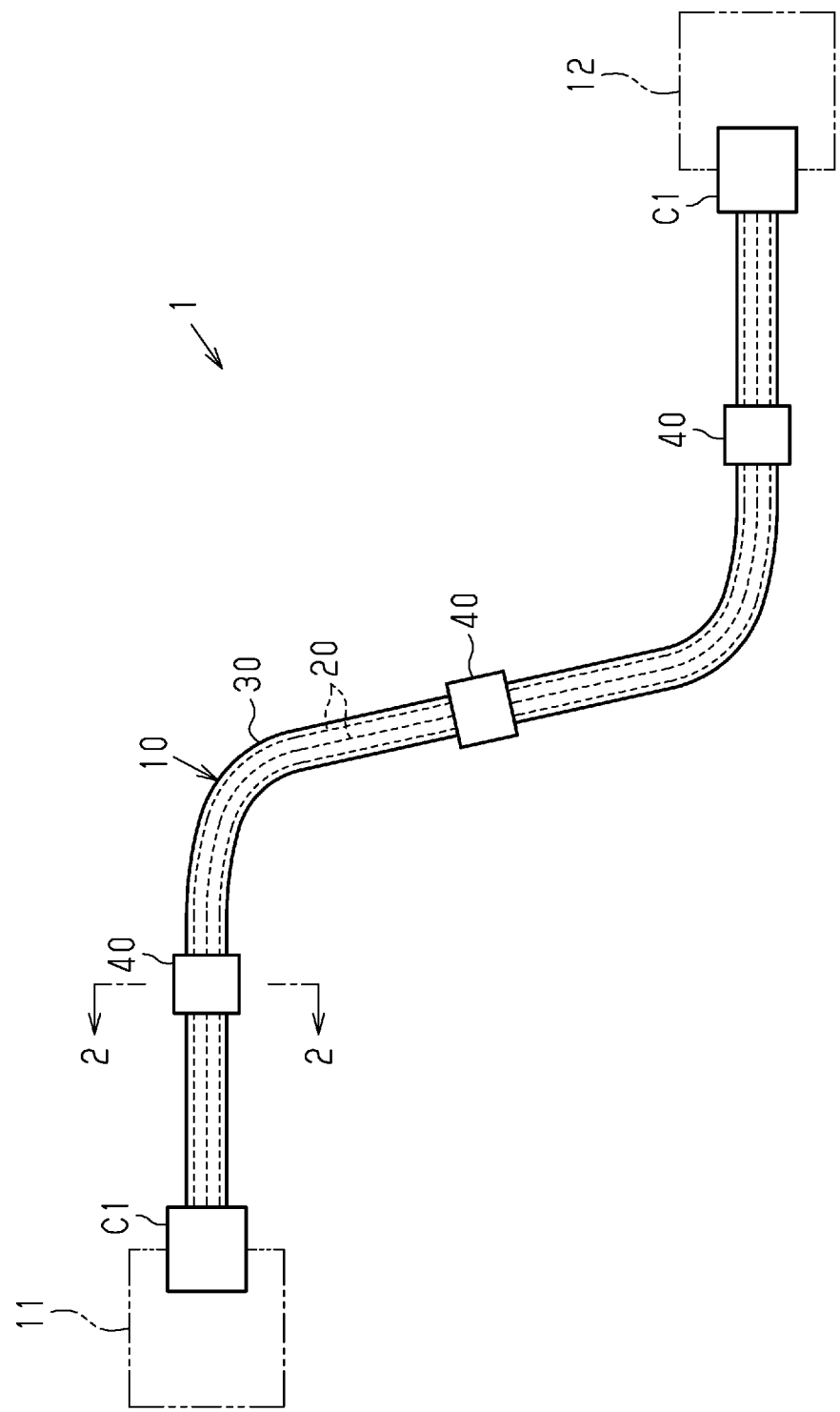
FIG. 1 is a schematic configuration diagram showing a clamp-equipped wire harness according to an embodiment.

A clamp-equipped wire harness 1 shown in FIG. 1 includes a wire harness 10 and one or more (three in this embodiment) clamps 40.

The wire harness 10 electrically connects two electrical apparatuses (devices), or three or more electric apparatuses (devices). The wire harness 10 electrically connects an inverter 11 disposed in a front part of a vehicle, such as a hybrid vehicle or an electric vehicle, and a high-voltage battery 12 installed in the vehicle rearward of the inverter 11, for example. The wire harness 10 is routed under the floor of the vehicle, for example. The inverter 11 is connected to a wheel driving motor (not shown), which is a power source for driving the vehicle. The inverter 11 generates AC power from DC power that is supplied from the high-voltage battery 12, and supplies the AC power to the motor. The high-voltage battery 12 is a battery that can supply a voltage of several hundred volts, for example.

The wire harness 10 includes one or more (two in the example) wires 20, a pair of connectors C1 respectively attached to two end portions of the wires 20, and an outer cover member 30 collectively enclosing the plurality of wires 20. One end portion of the wires 20 is connected to the inverter 11 via one of the connectors C1, and the other end portion of the wires 20 is connected to the high-voltage battery 12 via the other connector C1. Each wire 20 is elongated to extend in the front-rear direction of the vehicle, for example. Each wire 20 is formed so as to be bent into a two-dimensional shape or three-dimensional shape, for example. The wire 20 is bent into a predetermined shape corresponding to the wiring route of the wire harness 10, for example. The wires 20 are high-voltage wires that can handle high voltages and large currents, for example. The wires 20 may be non-shielded wires that have no electromagnetically shielded structure, for example, or may be shielded wires that have an electromagnetically shielded structure. The outer cover member 30 protects the wires 20 from flying objects and water droplets, for example. The outer cover member 30 in which the plurality of wires 20 are housed is fixed to a vehicle body or the like by the clamps 40.

Figure 2:
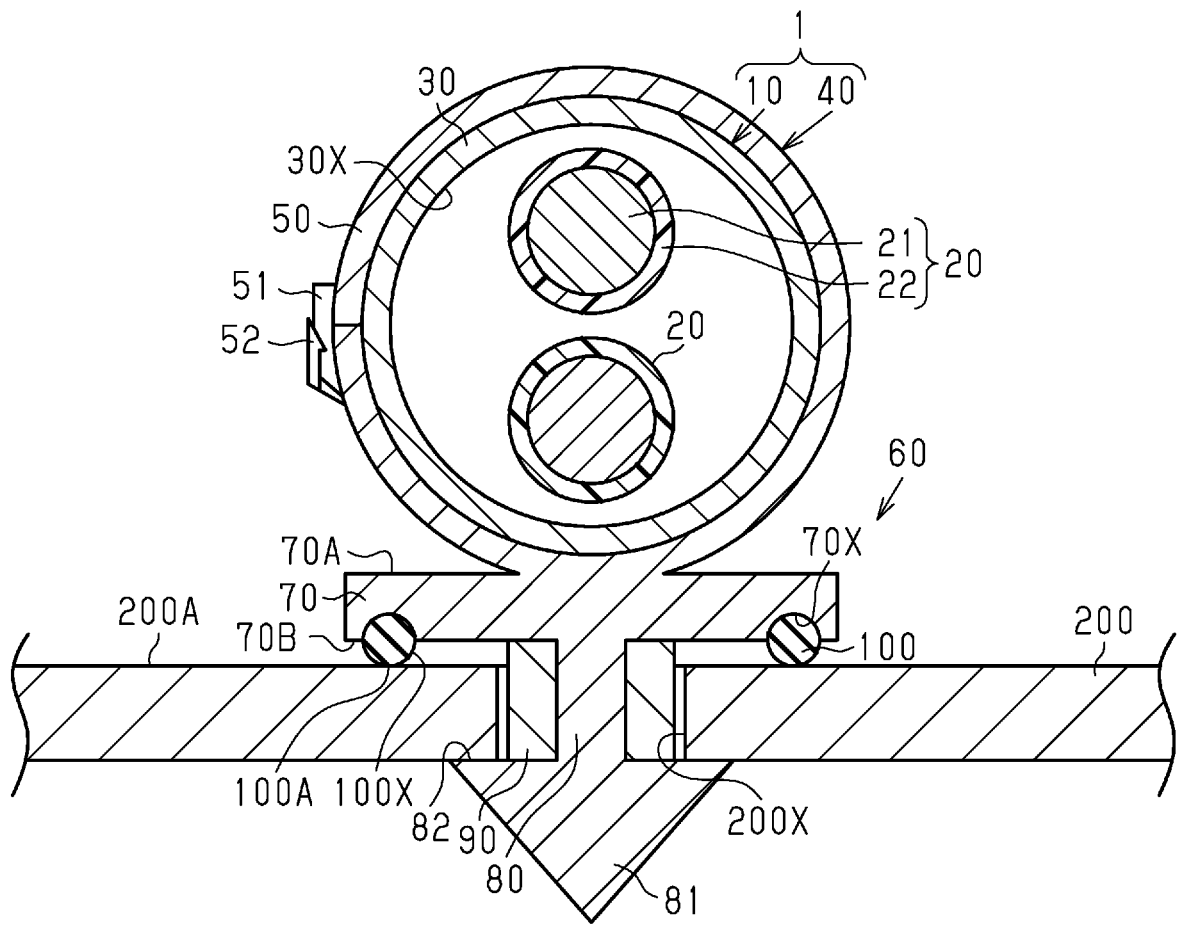
FIG. 2 is a schematic cross-sectional view (a cross-sectional view taken along 2-2 in FIG. 1) showing the clamp-equipped wire harness according to an embodiment.

As shown in FIG. 2, the wires 20 are coated wires each including a core wire 21 formed by a conductor and an insulating sheath 22 that covers the outer circumference of the core wire 21. A twisted wire obtained by twisting a plurality of bare metal wires together, a columnar conductor (a single core wire, a bus bar, or the like) constituted by one columnar metal rod that is solid, or a tubular conductor (a pipe conductor) that is hollow can be used for the core wire 21, for example. Also, a twisted wire, a columnar conductor, and a tubular conductor may be used in combination as the core wire 21. A metallic material such as a copper-based material or an aluminum-based material can be used as the material of the core wires 21, for example. The core wires 21 are formed through extrusion molding, for example.

The cross-sectional shape (i.e., a transverse cross-sectional shape) obtained by cutting a core wire 21 along a plane orthogonal to the length direction of the core wire 21 may be any shape. The transverse cross-sectional shape of each core wire 21 is a circular, semicircular, polygonal, square, or flat shape, for example. The transverse cross-sectional shape of the core wire 21 in this embodiment is a circular shape.

The insulating sheaths 22 respectively cover the entire outer circumferential surfaces of the core wires 21 in intimate contact therewith, for example. The insulating sheath 22 is made of an insulating material such as a synthetic resin, for example. The insulating sheath 22 can be formed through, for example, extrusion molding (extrusion coating) performed on the core wire 21.

The outer cover member 30 has an overall elongated tubular shape. The plurality of wires 20 are inserted into an internal space 30X of the outer cover member 30. The plurality of wires 20 are arranged side-by-side in the up-down direction of the vehicle in the internal space 30X, for example. The outer cover member 30 is formed so as to enclose the entire outer circumference of the plurality of wires 20. Metal pipes or resin pipes, resin protectors, flexible corrugated tubes made of resin or the like, waterproof rubber covers, or a combination thereof may be used for the outer cover member 30, for example. A metallic material such as a copper-based material or an aluminum-based material can be used as the material of a metal pipe. A conductive resin material or a resin material that has no conductivity can be used as the material of a resin protector or a resin corrugated tube, for example. It is possible to use a synthetic resin such as polyolefin, polyamide, polyester, or an ABS resin, for this resin material, for example. The outer cover member 30 in this example is a corrugated tube that has an accordion structure in which annular recesses and annular protrusions are arranged alternately in the length direction thereof.

The transverse cross-sectional shape of the outer cover member 30 may be any shape. The transverse cross-sectional shape of the outer cover member 30 is a circular, semicircular, polygonal, square, or flat shape, for example. The transverse cross-sectional shape of the outer cover member 30 in this embodiment is a circular shape. That is, the outer cover member 30 in this embodiment has a cylindrical shape.

As shown in FIG. 1, the plurality of clamps 40 are provided at predetermined intervals in the length direction of the wire harness 10. The clamps 40 are attached to the outer circumferential surface of the outer cover member 30.

As shown in FIG. 2, each clamp 40 has a holding portion 50 for holding the wire harness 10 and a fixing portion 60 to be fixed to a panel 200 of a vehicle body that is a fixed portion.

The holding portion 50 has an overall tubular shape (a cylindrical shape in this modification) large enough to be fitted to the outside of the outer cover member 30. The holding portion 50 can be opened by releasing locking between a locking portion 51 and a locked portion 52 that can be locked to each other. The wire harness 10 can be fitted to the inside of the holding portion 50 by opening the holding portion 50. Also, with the clamp 40, the wire harness 10 can be held inside the holding portion 50 by closing the holding portion 50. With the clamp 40, the closed state of the holding portion 50 is locked by locking the locking portion 51 to the locked portion 52. In a state in which the holding portion 50 is locked in this manner, the holding portion 50 encloses the entire outer circumference of the outer cover member 30, and the holding portion 50 can apply a predetermined fastening force to the portion thereof. Therefore, when the holding portion 50 is locked, the wire harness 10 (specifically, the outer cover member 30) is held by the holding portion 50. Note that at least a portion of the inner circumferential surface of the holding portion 50 is in contact with the outer circumferential surface of the outer cover member 30 in a state in which the holding portion 50 is locked.

The fixing portion 60 is formed in a portion of the outer circumferential surface of the holding portion 50. The fixing portion 60 is provided at a position of the outer circumferential surface of the holding portion 50 that is spaced apart from the locking portion 51 and the locked portion 52, for example. The fixing portion 60 shown in FIG. 2 is provided in a lower portion of the outer circumferential surface of the holding portion 50 in the up-down direction of the vehicle (i.e., in the up-down direction in FIG. 2).

The fixing portion 60 includes a base portion 70 (base), a support shaft 80, a locking portion 81 (lock) formed at a leading end of the support shaft 80, a spring portion 90 (spring), and a vibration suppressing member 100 (vibration suppressor). The base portion 70 is formed as a single body with the holding portion 50, for example. The support shaft 80 is formed as a single body with the base portion 70, for example. The locking portion 81 is formed as a single body with the support shaft 80, for example. With the clamp 40 of this embodiment, the holding portion 50, the base portion 70, the support shaft 80, and the locking portion 81 are continuous with each other as a single component. The holding portion 50, the base portion 70, the support shaft 80, and the locking portion 81 are molded as a single resin molded article, for example. The holding portion 50, the base portion 70, the support shaft 80, and the locking portion 81 are made of the same material, for example. It is possible to use a synthetic resin such as polyolefin, polyamide, polyester, or an ABS resin, as the material of the holding portion 50, the base portion 70, the support shaft 80, and the locking portion 81, for example. A metallic material such as an iron-based material or an aluminum-based material can be used as the material of the holding portion 50, the base portion 70, the support shaft 80, and the locking portion 81, for example.

The base portion 70 has a first surface 70A (an upper surface in this embodiment) that faces the holding portion 50 side and a second surface 70B (a lower surface in this embodiment) located opposite to the first surface 70A. The holding portion 50 is formed in a substantially central portion of the first surface 70A of the base portion 70. The second surface 70B of the base portion 70 faces the panel 200 of the vehicle body that is a fixed portion.

The base portion 70 is formed in a circular plate shape, for example. The planar shape of the base portion 70 is larger than the planar shape of the locking portion 81, for example. Here, this specification, a "circular plate shape" refers to a substantially circular planar shape with a predetermined thickness. Note that there is no limitation on the magnitude of the thickness relative to the diameter of a "circular plate shape". Furthermore, shapes in which a recessed portion and/or a protruding portion is partially formed are also included in a "circular plate shape". Also, in this specification, a "plan view" refers to viewing an object from a normal direction (the up-down direction in FIG. 2) of the first surface 70A of the base portion 70, and a "planar shape"

refers to a shape of an object when viewed from the normal direction of the first surface 70A of the base portion 70.

The second surface 70B of the base portion 70 is provided with a groove portion 70X (groove) recessed toward the first 70A side. The groove portion 70X is formed such that the bottom surface thereof is located at an intermediate position in the thickness direction of the base portion 70. The bottom surface of the groove portion 70X has an arc-shaped cross-section, for example. The cross-sectional shape of the groove portion 70X is a semicircular shape, for example.

Figure 3:
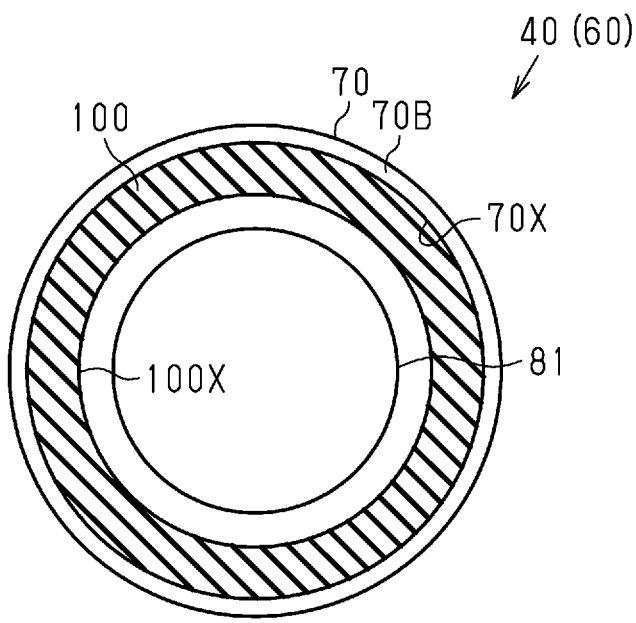
FIG. 3 is a schematic plan view showing a clamp according to an embodiment.

As shown in FIG. 3, the groove portion 70X is formed in an annular shape, for example. The groove portion 70X is formed in an annular shape (ring shape) extending along the outer circumferential edge of the second surface 70B, for example. The groove portion 70X is formed in an annular shape surrounding the entire outer circumferential edge of the locking portion 81 in a plan view.

As shown in FIG. 2, the support shaft 80 is formed in the central portion of the second surface 70B of the base portion 70. A base end portion of the support shaft 80 is connected to the second surface 70B of the base portion 70. The base end portion of the support shaft 80 is continuous with the base portion 70 as a single body, for example. The support shaft 80 is formed so as to extend from the second surface 70B of the base portion 70 in a direction away from the holding portion 50. The support shaft 80 is formed in a columnar shape extending along the radial direction of the holding portion 50, for example. The support shaft 80 in this embodiment has a round columnar shape.

The leading end portion of the support shaft 80 is provided with a locking portion 81. The locking portion 81 is continuous with the support shaft 80 as a single body, for example. The locking portion 81 is formed so as to protrude laterally from the leading end of the support shaft 80. The locking portion 81 is formed so as to protrude laterally from the entire periphery of the leading end of the support shaft 80 in the circumferential direction, for example. The locking portion 81 is formed in a conical shape, for example. The locking portion 81 is formed to be able to be inserted into and locked to an attachment hole 200X formed in the panel 200. Specifically, the locking portion 81 is formed so as to be elastically deformable so as to be insertable into the attachment hole 200X, and to be able to be locked to the panel 200 at a circumferential edge of the attachment hole 200X after the locking portion 81 is inserted into the attachment hole 200X. Note that the attachment hole 200X has a circular shape in a plan view, for example.

The width of a portion of the locking portion 81 that is the widest in the direction that is orthogonal to the direction in which the support shaft 80 extends, that is, the diameter of a bottom surface 82 of the cone in this embodiment, is set larger than the opening diameter of the attachment hole 200X. The locking portion 81 is formed to be elastically deformable such that the diameter of the bottom surface 82 is equal to or less than the opening diameter of the attachment hole 200X.

When the locking portion 81 is inserted into the attachment hole 200X, the locking portion 81 elastically deforms and proceeds into the attachment hole 200X such that the diameter of the bottom surface 82 of the cone is reduced. Then, when the locking portion 81 passes through the attachment hole 200X, the locking portion 81 elastically returns to its original shape, and the bottom surface 82 of the locking portion 81 is locked to the circumferential edge of the attachment hole 200X. Accordingly, the clamp 40 is fixed to the panel 200 of the vehicle body, and the wire harness 10 held by the clamp 40 is fixed to the vehicle body.

The spring portion 90 is formed so as to enclose the outer circumference of the support shaft 80. The spring portion 90 is formed so as to enclose the entire outer circumference of the support shaft 80, for example. The spring portion 90 covers the entire outer circumferential surface of the support shaft 80 in intimate contact therewith, for example. The spring portion 90 is formed so as to enclose the outer circumference of the support shaft 80 over the entire length of the support shaft 80 in the direction in which the support shaft 80 extends, for example. That is, the spring portion 90 is formed so as to extend from the second surface 70B of the base portion 70 to the locking portion 81 in the direction in which the support shaft 80 extends. The spring portion 90 is in contact with the second surface 70B of the base portion 70 and is in contact with the bottom surface 82 of the locking portion 81, for example. The spring portion 90 is formed in a tubular shape in which the support shaft 80 is accommodated therein.

Figure 4:
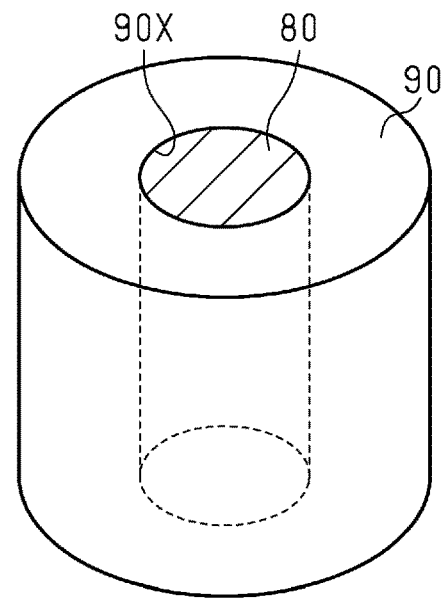
FIG. 4 is a schematic perspective view showing a portion of a clamp according to an embodiment.

As shown in FIG. 4, the spring portion 90 in this embodiment has a cylindrical shape in which the round columnar support shaft 80 is accommodated therein. That is, the spring portion 90 in this embodiment is a cylindrical spring. The spring portion 90 in this embodiment has a round columnar through-hole 90X. The through-hole 90X is filled by the support shaft 80.

The spring portion 90 is formed as a single body with the support shaft 80, for example. However, a material different from that of the support shaft 80 is used as the material of the spring portion 90. It is possible to use a material whose elastic modulus is different from that of the constituent material of the support shaft 80, as the material of the spring portion 90, for example. It is possible to use a material whose elastic modulus is lower than that of the material constituting the support shaft 80, as the material of the spring portion 90, for example. A viscoelastic body having higher viscoelasticity and softness than the material constituting the support shaft 80 can be used as the material of the spring portion 90, for example. A rubber material or a foam material can be used as the material of the spring portion 90, for example. Silicone rubber, urethane rubber, acrylic rubber, nitrile rubber, butyl rubber, ethylene propylene rubber, or the like can be used as the rubber material, for example. Such a spring portion 90 is formed as a single body with the support shaft 80 through two-color molding, for example.

As shown in FIG. 2, the vibration suppressing member 100 is formed so as to protrude from the second surface 70B of the base portion 70 toward the locking portion 81 side. The vibration suppressing member 100 is formed so as to face the attachment surface 200A of the panel 200, for example. A leading end surface 100A of the vibration suppressing member 100 that faces the panel 200 is formed in a curved shape, for example. The vibration suppressing member 100 has a circular cross-section, for example. A portion of the vibration suppressing member 100 is fitted to the groove portion 70X in the base portion 70, for example. A portion of the vibration suppressing member 100 is pressed into the groove portion 70X, for example. A semicircular portion of the vibration suppressing member 100 is fitted to the groove portion 70X in a cross-sectional view, and the remaining semicircular portion is formed so as to protrude from the second surface 70B of the base portion 70 toward the panel 200 side, for example. That is, a portion of the vibration suppressing member 100 that protrudes from the second surface 70B of the base portion 70 toward the locking portion 81 side has a semicircular cross-section.

As shown in FIG. 3, the vibration suppressing member 100 is formed in an annular shape, for example. The vibration suppressing member 100 is formed in an annular shape (ring shape) extending along the outer circumferential edge of the second surface 70B of the base portion 70, for example. The vibration suppressing member 100 is formed in an annular shape surrounding the entire outer circumferential edge of the locking portion 81 in a plan view, for example. In other words, the vibration suppressing member 100 is formed in an annular shape having a through-hole 100X that is larger than the outer shape of the locking portion 81.

As shown in FIG. 2, the vibration suppressing member 100 is set such that the amount by which it protrudes from the second surface 70B of the base portion 70 is smaller than the amount by which the support shaft 80 protrudes from the second surface 70B of the base portion 70. When the clamp 40 is fixed to the panel 200, the vibration suppressing member 100 is in contact with the attachment surface 200A of the panel 200. The curved leading end surface 100A of the vibration suppressing member 100 is in contact with the attachment surface 200A, for example.

Figure 5:
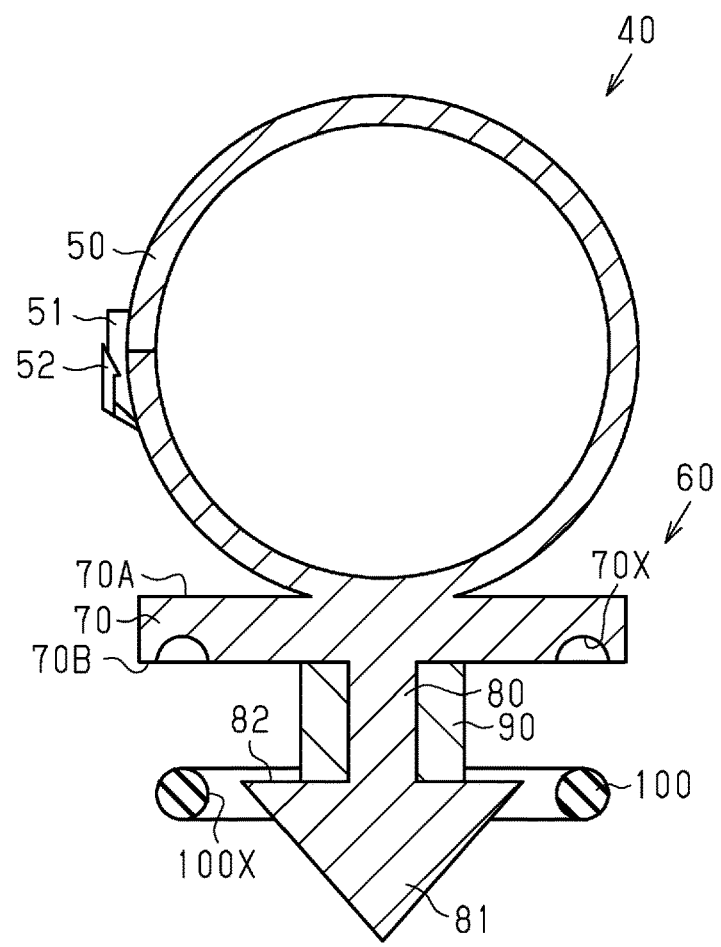
FIG. 5 is a schematic cross-sectional view showing a clamp according to an embodiment.

As shown in FIG. 5, the vibration suppressing member 100 is formed separately from the base portion 70, for example. The vibration suppressing member 100 is attached to the base portion 70 at a later time, for example. The vibration suppressing member 100 is inserted from the leading end portion side (the lower side in FIG. 5) of the locking portion 81 into the groove portion 70X in the base portion 70, and is pressed into the groove portion 70X, for example. At this time, the locking portion 81 and the support shaft 80 are inserted into the through-hole 100X in the vibration suppressing member 100.

A material having impact absorbing properties better than those of a material constituting the base portion 70 can be used as the material of the vibration suppressing member 100, for example. A viscoelastic body having higher viscoelasticity and softness than the material constituting the base portion 70 can be used as the material of the vibration suppressing member 100, for example. The material of the vibration suppressing member 100 may be the same as that of the spring portion 90 or different from that of the spring portion 90, for example. A rubber material or a foam material can be used as the material of the vibration suppressing member 100, for example. Silicone rubber, urethane rubber, acrylic rubber, nitrile rubber, butyl rubber, ethylene propylene rubber, or the like can be used as the rubber material, for example.

Next, the effects of this embodiment will be described.

(1) The second surface 70B of the base portion 70 to which the base end of the support shaft 80 is connected is provided with the vibration suppressing member 100 that protrudes from the second surface 70B toward the locking portion 81 side. According to this configuration, when the locking portion 81 formed at the leading end of the support shaft 80 is locked to the panel 200, the vibration suppressing member 100 whose elastic modulus is lower than that of the base portion 70 can be brought into contact with the attachment surface 200A of the panel 200. Here, when the panel 200 of the vehicle body vibrates while the vehicle is traveling, for example, the vibration suppressing member 100 elastically deforms, and the vibration energy can be absorbed according to the deformation amount and the deformation speed of the vibration suppressing member 100. Accordingly, it is possible to dampen vibration transmitted from the clamp 40 to the wire harness 10. As a result, it is possible to suppress the occurrence of problems such as disconnection of the wires 20 and breakage of the clamps 40 due to vibration.

(2) Also, the second surface 70B of the base portion 70 is provided with the vibration suppressing member 100, and thus, the structure of the base portion 70 on the first surface 70A side (e.g., the structure of the holding portion 50) is not limited by the presence of the vibration suppressing member 100. Therefore, it is possible to freely design the structure of the holding portion 50 regardless of the presence of the vibration suppressing member 100. Accordingly, even if the size or the outer shape of the wire harness 10 is changed, for example, it is possible to readily handle the change.

(3) The spring portion 90 made of a material whose elastic modulus is lower than that of the support shaft 80 is formed so as to enclose the entire outer circumference of the support shaft 80. According to this configuration, when the panel 200 of the vehicle body vibrates, it is possible to absorb impact transmitted from the clamp 40 to the wire harness 10 due to elastic deformation of the spring portion 90. Also, because the support shaft 80 is enclosed by the spring portion 90, the deformation amount of the support shaft 80 can be suppressed by the spring portion 90. As a result, even if vibration is applied from the panel 200 or the like to the clamp 40, it is possible to suppress the occurrence of problems such as breakage of the support shaft 80.

(4) The spring portion 90 is formed so as to enclose the outer circumference of the support shaft 80 over the entire length thereof in the direction in which the support shaft 80 extends. According to this configuration, the deformation amount of the support shaft 80 can be suppressed by the spring portion 90 over the entire length of the support shaft 80. Therefore, even if vibration is applied from the panel 200 or the like to the clamp 40, it is possible to suitably suppress the occurrence of problems such as breakage of the support shaft 80.

(5) The support shaft 80 is formed in a round columnar shape, the spring portion 90 is formed in a cylindrical shape, and the vibration suppressing member 100 is formed in an annular shape surrounding the outer circumference of the spring portion 90. According to this configuration, even if vibration is applied from any direction, the cylindrical spring portion 90 and the annular vibration suppressing member 100 can evenly absorb the vibration.

(6) A portion of each vibration suppressing member 100 is fitted to the groove portion 70X formed in the second surface 70B of the base portion 70. According to this configuration, it is possible to attach the vibration suppressing member 100 to the base portion 70 by fitting the portion of the vibration suppressing member 100 to the groove portion 70X. Therefore, even if the vibration suppressing member 100 is formed separately from the base portion 70, it is possible to readily attach the vibration suppressing member 100 to the base portion 70.

(7) The planar shape of the base portion 70 is made larger than the planar shape of the locking portion 81, and the vibration suppressing member 100 is formed in an annular shape having the through-hole 100X whose planar shape is larger than that of the locking portion 81. According to this configuration, because the locking portion 81 and the support shaft 80 can be inserted into the through-hole 100X in the vibration suppressing member 100, even if the vibration suppressing member 100 is formed separately from the base portion 70, it is possible to readily attach the vibration suppressing member 100 to the base portion 70.

(8) A portion of the vibration suppressing member 100 that protrudes from the second surface 70B of the base portion 70 toward the locking portion 81 side is formed in a semicircular shape in a cross-sectional view. According to this configuration, it is possible to suitably suppress the occurrence of buckling of the vibration suppressing member 100, compared to a case where a portion of the vibration suppressing member 100 that protrudes from the second surface 70B of the base portion 70 toward the locking portion 81 side is formed in a rectangular shape in a cross-sectional view.

OTHER EMBODIMENTS

The above-described embodiment can be modified as follows. The above-described embodiment and the following modifications may be combined to the extent that they do not contradict each other technically.

Figure 6:
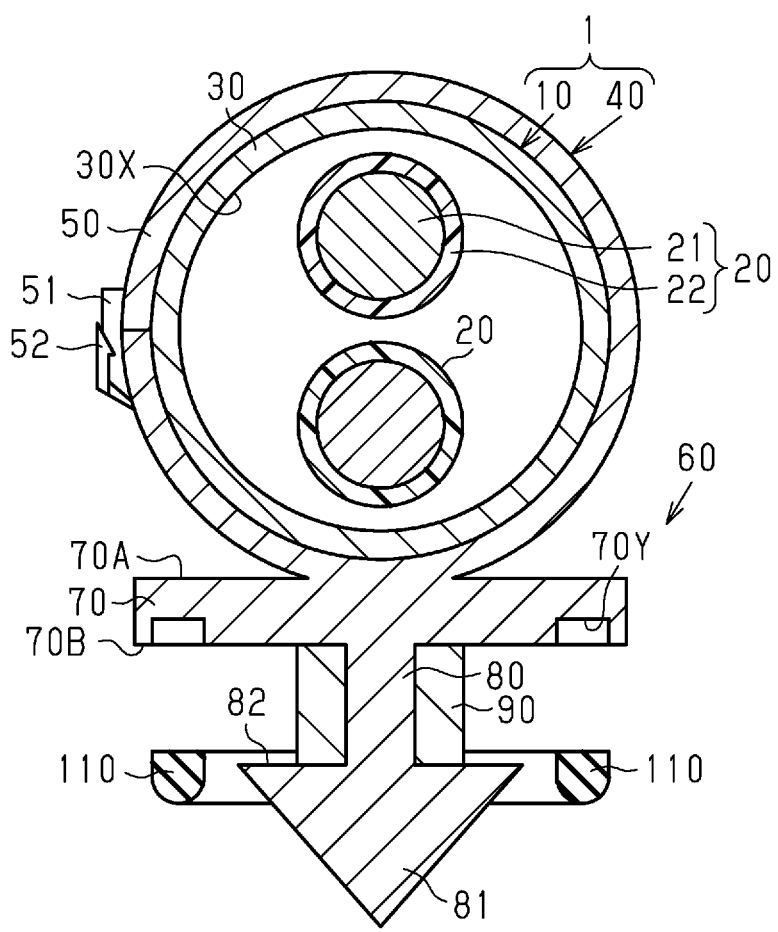
FIG. 6 is a schematic cross-sectional view showing a clamp-equipped wire harness according to a modification example.

Although the groove portion 70X is formed in a semicircular shape in a cross-sectional view in the above-described embodiment, there is no particular limitation on the shape of the groove portion 70X. As shown in FIG. 6, a groove portion 70Y having a rectangular shape in a cross-sectional view may be formed in the second surface 70B of the base portion 70, for example. In this case, a portion of a vibration suppressing member 110 is fitted to the groove portion 70Y. This vibration suppressing member 110 is formed in a shape having a rectangular cross-section in a plan view, for example. In the example shown in FIG. 6, a portion of the vibration suppressing member 110 that protrudes toward the locking portion 81 side relative to the second surface 70B of the base portion 70 is formed in a semicircular shape in a cross-sectional view. However, a portion of the vibration suppressing member 110 that protrudes toward the locking portion 81 relative to the second surface 70B of the base portion 70 may be formed in a rectangular shape in a cross-sectional view. That is, the overall cross-sectional shape of the vibration suppressing member 110 may be formed in a rectangular shape.

Although the groove portion 70X and the vibration suppressing member 100 are formed in an annular shape in the above-described embodiment, there is no limitation thereto. The groove portion 70X and the vibration suppressing member 100 may be formed in a rectangular annular shape (frame shape), for example.

Although the base portion 70 is formed in a circular shape in a plan view in the above-described embodiment, there is no limitation thereto. The base portion 70 may be formed in a rectangular shape in a plane view, for example.

Figure 7:
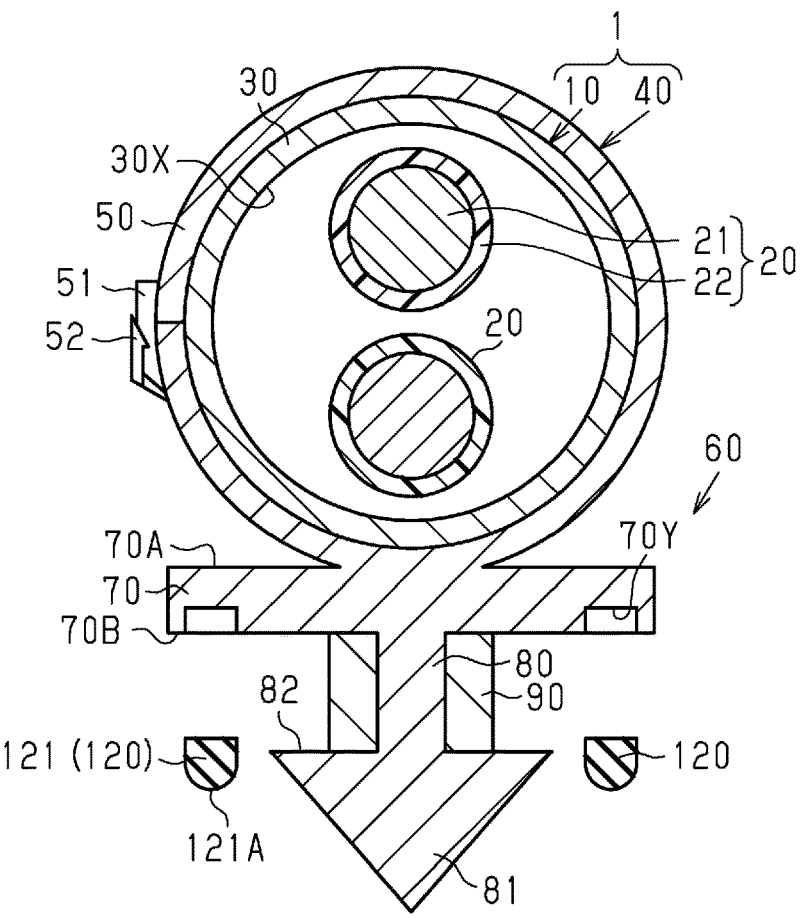
FIG. 7 is a schematic cross-sectional view showing a clamp-equipped wire harness according to a modification example.

Although the groove portion 70X and the vibration suppressing member 100 are formed in an annular shape in the above-described embodiment, there is no limitation thereto. As shown in FIG. 7, a vibration suppressing member 120 may be constituted by multiple divided bodies 121, for example. The multiple divided bodies 121 are formed independently of each other, and are provided at positions where they are spaced apart from each other on the second surface 70B of the base portion 70. Each divided body 121 is formed in a columnar shape, for example. Each divided body 121 is formed in a round columnar shape, for example. A leading end portion 121A of the divided body 121 shown in FIG. 7 that faces the locking portion 81 side is formed in a hemispherical shape. However, the overall divided body 121 may be formed in a round columnar shape.

Figure 8:
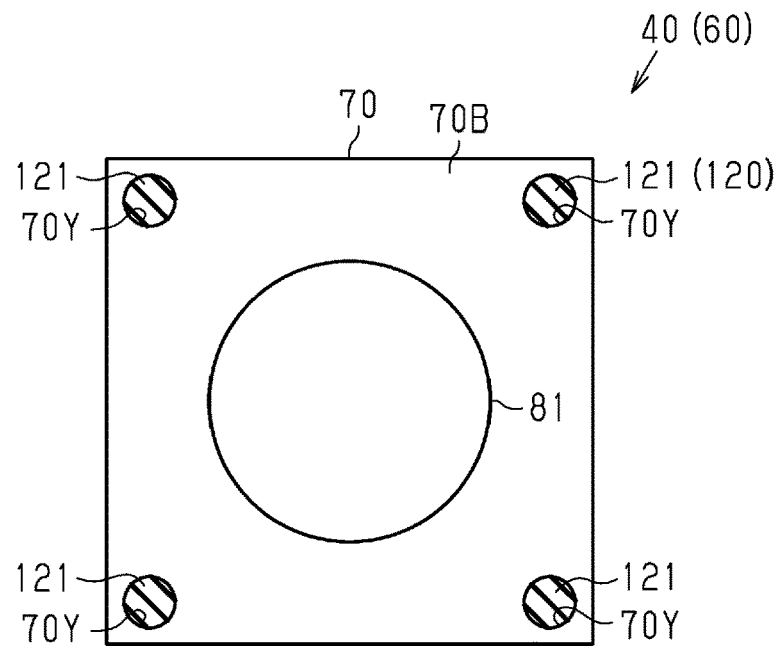
FIG. 8 is a schematic plan view showing a clamp according to a modification embodiment.

Also, as shown in FIG. 8, groove portions 70Y may be formed in four corners of the second surface 70B of the base portion 70 that is formed in a rectangular shape in a plan view, for example. The four groove portions 70Y are formed independently of each other, and are provided at positions where they are spaced apart from each other in the second surface 70B of the base portion 70. The divided bodies 121 are respectively fitted to the groove portions 70Y.

If the vibration suppressing member 120 is constituted by multiple divided bodies 121 in this manner, it is possible to keep the divided bodies 121 from interfering with the locking portion 81 when attaching each divided body 121. Thus, even if the planar shape of the base portion 70 is formed smaller than the planar shape of the locking portion 81, for example, it is possible to attach each divided body 121 to the base portion 70 without interference with the locking portion 81.

There is no particular limitation on the shape of the divided bodies 121. Each divided body 121 may be formed in a spherical or hemispherical shape, for example.

Although the groove portion 70X is formed in the second surface 70B of the base portion 70 and the vibration suppressing member 100 is attached to the base portion 70 by fitting a portion of the vibration suppressing member 100 to the groove portion 70X in the above-described embodiment, there is no limitation thereto.

Figure 9:
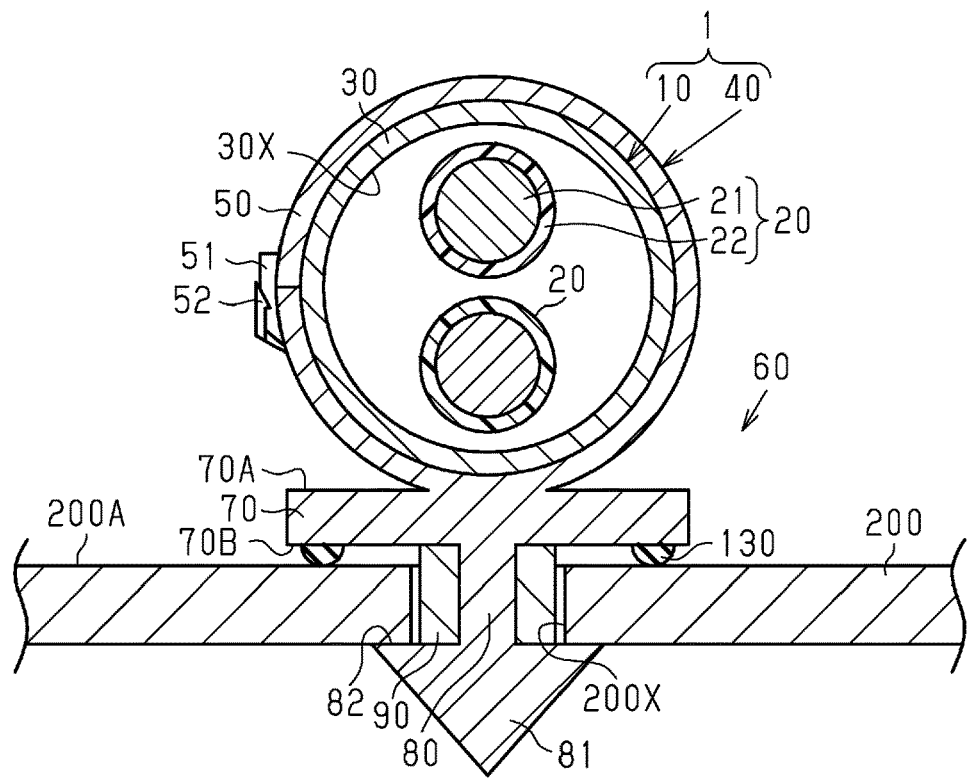
FIG. 9 is a schematic cross-sectional view showing a clamp-equipped wire harness according to a modification example.

As shown in FIG. 9, the formation of the groove portion 70X may be omitted, for example. In this case, a vibration suppressing member 130 may be adhered to the second surface 70B of the base portion 70 using an adhesive or the like, for example. The vibration suppressing member 130 shown in FIG. 9 is formed in a semicircular shape in a cross-sectional view, and the flat surface portion thereof is adhered to the second surface 70B of the base portion 70.

Figure 10:
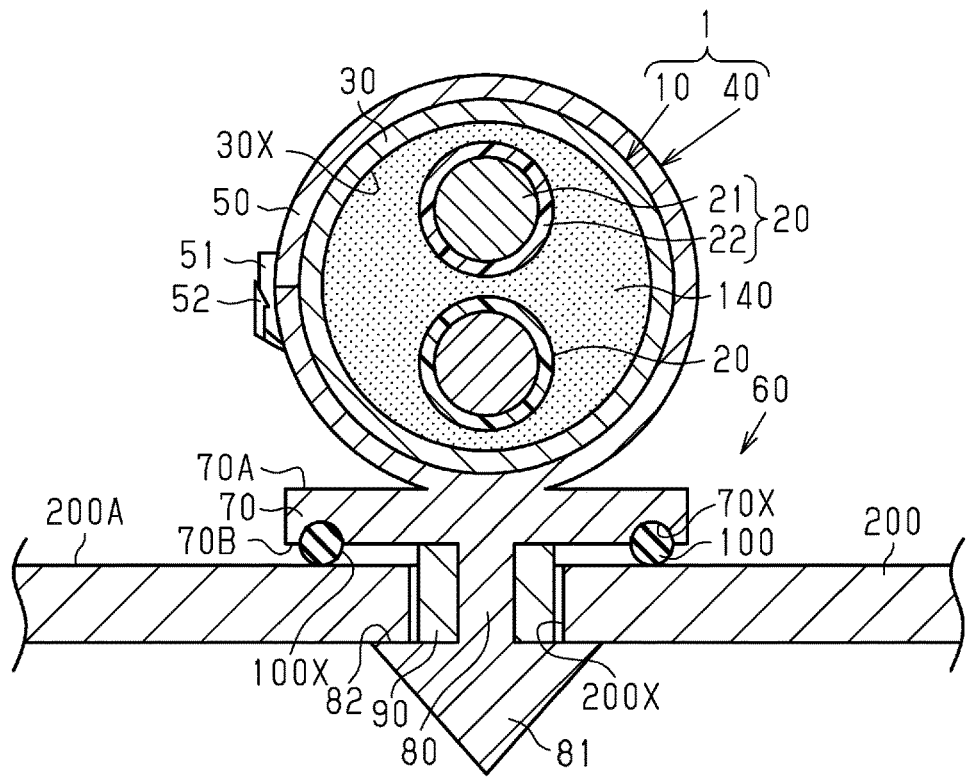
FIG. 10 is a schematic cross-sectional view showing a clamp-equipped wire harness according to a modification example.

As shown in FIG. 10, the internal space 30X of the outer cover member 30 may be provided with a spacer 140. The spacer 140 is provided in a portion enclosed by the holding portion 50 of the clamp 40 in the length direction of the outer cover member 30, for example. The spacer 140 is formed so as to fill the space between the outer circumferential surfaces of the wires 20 and the inner circumferential surface of the outer cover member 30. The spacer 140 covers the entire outer circumferential surfaces of the wires 20 in intimate contact therewith, for example. The spacer 140 covers the entire inner circumferential surface of the outer cover member 30 in intimate contact therewith, for example. This spacer 140 functions as a wire holding portion for holding the wires 20.

It is possible to use a material similar to that of the vibration suppressing member 100 as the material of the spacer 140, for example. A rubber material or a foam material can be used as the material of the spacer 140, for example. Silicone rubber, urethane rubber, acrylic rubber, nitrile rubber, butyl rubber, ethylene propylene rubber, or the like can be used as the rubber material, for example.

By providing the above-described spacer 140, it is possible to suppress rattling of the wires 20 in the outer cover member 30. Accordingly, even if vibration is transmitted from the panel 200 side to the wire harness 10 via the clamp 40, for example, it is possible to suppress vibration of the wires 20 caused by the transmitted vibration. Thus, it is possible to favorably suppress disconnection of the wires 20 caused by vibration.

In a modification example shown in FIG. 10, the spacer 140 may be provided over substantially the entire length of the outer cover member 30 in the length direction.

In the modification example shown in FIG. 10, a gap may be present between the outer circumferential surface of the spacer 140 and the inner circumferential surface of the outer cover member 30.

In the modification example shown in FIG. 10, a gap may be present between the inner circumferential surface of the spacer 140 and the outer circumferential surfaces of the wires 20.

Although the spring portion 90 and the support shaft 80 are formed as a single body in the above-described embodiment, there is no limitation thereto. The spring portion 90 may be constituted by a component separate from the support shaft 80, for example. In this case, the spring portion 90 may be constituted by two half-split tubular portions, and the spring portion 90, which is to enclose the outer circumference of the support shaft 80, may be formed by joining these half-split tubular portions together with the support shaft 80 interposed therebetween, for example.

There is no particular limitation on the shape of the locking portion 81 in the above-described embodiment. The shape of the locking portion 81 is not particularly limited as long as the locking portion 81 can be inserted into and locked to the attachment hole 200X in the panel 200.

Although the support shaft 80 is formed in a round columnar shape in the above-described embodiment, there is no limitation thereto. The support shaft 80 may be formed in a prismatic shape such as a square columnar shape or a triangular columnar shape, for example. In this case, the spring portion 90 is formed in a rectangular cylindrical shape.

The spring portion 90 may be omitted from the above-described embodiment.

There is no particular limitation on the shape of the holding portion 50 in the above-described embodiment. There is no particular limitation on the shape of the holding portion 50 as long as the holding portion 50 can hold the wire harness 10.

Although the holding portion 50 and the base portion 70 are formed as a single body in the above-described embodiment, the holding portion 50 and the base portion 70 may be formed separately from each other, for example.

All clamps 40 attached to the wire harness 10 in the above-described embodiment need not have the same structure. A structure may be adopted in which only one of three clamps 40 has the vibration suppressing member 100 and the remaining two clamps 40 do not have the vibration suppressing member 100, for example.

Although not specifically mentioned in the above-described embodiment, a configuration may be adopted in which an electromagnetic shielding member is provided inside the outer cover member 30. The electromagnetic shielding member is provided so as to collectively enclose a plurality of wires 20, for example. The electromagnetic shielding member is provided between the inner circumferential surface of the outer cover member 30 and the outer circumferential surfaces of the wires 20, for example. It is possible to use a flexible braided wire or metal film as an electromagnetic shielding member, for example. Also, it is possible to use a braided wire in which multiple bare metal wires are braided, and a braided wire in which a bare metal wire and a bare resin wire are braided together, as a braided wire. It is possible to use reinforced fibers with good insulating properties and shear resistance, such as para-aramid fibers, as a bare resin wire, for example.

Although the outer cover member 30 is formed in a substantially perfect cylindrical shape in the above-described embodiment, there is no limitation thereto, and the outer cover member 30 may be formed in an elliptical cylindrical shape or a rectangular cylindrical shape.

Although two wires 20 are inserted into the inside of the outer cover member 30 in the above-described embodiment, there is no particular limitation thereto, and the number of wires 20 can be changed according to the specifications of a vehicle. The number of wires to be inserted into the inside of the outer cover member 30 may be one, three or more. A configuration may be adopted in which a low-voltage wire for connecting a low-voltage battery and various low-voltage devices (e.g., lamps and car audio devices) is added as a wire to be inserted into the outer cover member 30, for example. Also, only low-voltage wires may be used.

The outer cover member 30 may be omitted from the above-described embodiment.

The arrangement relationship between the inverter 11 and the high-voltage battery 12 in a vehicle is not limited to that of the above-described embodiment, and may be changed as appropriate according to the configurations of a vehicle.

Although the inverter 11 and the high-voltage battery 12 are adopted as electrical devices to be connected by the wire harness 10 in the above-described embodiment, there is no limitation thereto. This disclosure may be applied to a wire for connecting the inverter 11 and a wheel driving motor, for example. That is, it is applicable as long as electrical devices mounted in a vehicle can be electrically connected to each other.

The first surface 70A of the base portion 70 in an embodiment is an example of a wire harness holder support surface. The second surface 70B of the base portion 70 in an embodiment is an example of a base surface that coincides with or corresponds to the attachment surface 200A of the panel 200. The support shaft 80, the locking portion 81, and the bottom surface 82 in an embodiment are examples of an anchor. The support shaft 80 may be an anchor shank. The locking portion 81 and the bottom surface 82 may form an anchor claw.

The present disclosure encompasses the following implementation examples. Not for limitation but for assistance in understanding, the reference numerals of the representative components in the representative embodiment are provided.

[Appendix 1] One or more implementation examples of this disclosure is applicable to a clamp (40) for fixedly attaching a wire harness (10) to a panel (200) that includes an attachment surface (200A) having a through-hole (200X). The clamp (40) may comprise:
a tubular wire harness holder (50) configured to hold the wire harness (10);
a wire harness holder support surface (70A) for supporting the tubular wire harness holder (50);
a base surface (70B) that coincides with or corresponds to the attachment surface (200A) of the panel (200);
an anchor (80, 81, 82) that protrudes from the base surface (70B) and includes a shank (80) that has a base end connected to the base surface (70B) and a leading end located opposite to the base end, and a claw (81, 82) that is provided at the leading end of the shank (80) and spreads from the shank (80) outward in a radial direction; and
a vibration suppressing member (100; 110; 120; 130) attached to the base surface (70B);
in which the vibration suppressing member (100; 110; 120; 130) may be configured such that, when the shank (80) of the anchor (80, 81, 82) passes through the through-hole (200X) in the panel (200) and the claw (81, 82) is locked to the panel (200), the vibration suppressing member (100; 110; 120; 130)

comes into direct contact with the base surface (70B) and the attachment surface (200A) of the panel (200), and a gap or an air layer is formed between the base surface (70B) and the attachment surface (200A) of the panel (200).

[Appendix 2] In one or more implementation examples of this disclosure, the clamp (40) may further include a non-coiled spring tube (90) that encloses the shank (80) over the entire length of the shank (80), and comes into direct contact with the base surface (70B) and the claw (81, 82) of the anchor (80, 81, 82).

[Appendix 3] In one or more implementation examples of this disclosure, the vibration suppressing member (100; 110; 120; 130) is spaced apart from the spring tube (90) outward in the radial direction.

[Appendix 4] In one or more implementation examples of this disclosure, when the shank (80) of the anchor (80, 81, 82) passes through the through-hole (200X) in the panel (200) and the claw (81, 82) is locked to the panel (200), the vibration suppressing member (100; 110; 120; 130) does not come into contact with the spring tube (90).

[Appendix 5] In one or more implementation examples of this disclosure, when the shank (80) of the anchor (80, 81, 82) passes through the through-hole (200X) in the panel (200) and the claw (81, 82) is locked to the panel (200), the base surface (70B), the shank (80), and the tubular wire harness holder (50) do not come into contact with the attachment surface (200A) of the panel (200), the vibration suppressing member (100; 110; 120; 130) may come into direct contact with the attachment surface (200A) of the panel (200), and the spring tube (90) may optionally come into contact with the through-hole (200X) in the panel (200).

[Appendix 6] In one or more implementation examples of this disclosure, the vibration suppressing member (100; 110; 120; 130) may be attached to a recessed portion (70X, 70Y) in the base surface (70B).

[Appendix 7] In one or more implementation examples of this disclosure, the recessed portion (70X, 70Y) in the base surface (70B) may be formed in a vicinity of an outer edge of the base surface (70B).

[Appendix 8] In one or more implementation examples of this disclosure, the vibration suppressing member (100; 110; 130) may be a closed-loop-shaped elastic member, and the recessed portion (70X) in the base surface (70B) may be a loop-shaped groove that coincides with the closed-loop-shaped elastic member.

[Appendix 9] In one or more implementation examples of this disclosure, the vibration suppressing member (120) may be a plurality of block-shaped elastic members, and the recessed portion (70Y) in the base surface (70B) may be a plurality of individual pits that respectively coincide with the plurality of block-shaped elastic members.

[Appendix 10] In one or more implementation examples of this disclosure, the tubular wire harness holder (50), the wire harness holder support surface (70A), the base surface (70B), and the anchor (80, 81, 82) may be a one-piece component.

The invention claimed is:

1. A clamp comprising:
a holding portion configured to hold a wire harness; and
a fixing portion that is provided in a portion of an outer circumferential surface of the holding portion and is to be fixed to a fixed portion;
wherein the fixing portion includes:
a base that includes a first surface that faces a holding portion side and a second surface located opposite to the first surface,
a support shaft that extends from the second surface of the base in a direction away from the holding portion,
a lock that is provided at a leading end of the support shaft and is formed to be able to be locked to the fixed portion, and
a vibration suppressor that is made of a material whose elastic modulus is lower than that of the base and protrudes from the second surface of the base toward a lock side.

2. The clamp according to claim 1, further comprising a tubular spring that encloses an entire outer circumference of the support shaft,
wherein the spring is made of a material whose elastic modulus is lower than that of the support shaft.

3. The clamp according to claim 2,
wherein the spring is formed to enclose the outer circumference of the support shaft over an entire length of the support shaft in a direction in which the support shaft extends.

4. The clamp according to claim 2, wherein:
the support shaft is formed in a round columnar shape,
the spring is formed in a cylindrical shape, and
the vibration suppressor is formed in an annular shape surrounding an outer circumference of the spring in a plan view.

5. The clamp according to claim 1, wherein:
the second surface of the base is provided with a groove, and
a portion of the vibration suppressor is fitted to the groove.

6. The clamp according to claim 1, wherein:
a planar shape of the base is larger than a planar shape of the lock, and
the vibration suppressor is formed in an annular shape having a through-hole whose planar shape is larger than that of the lock.

7. The clamp according to claim 1, wherein:
the vibration suppressor includes a plurality of divided bodies, and
the plurality of divided bodies are spaced apart from each other on the second surface of the base.

8. The clamp according to claim 1,
wherein a portion of the vibration suppressor that protrudes from the second surface of the base toward the lock side is formed in a semicircular shape in a cross-sectional view.

9. A clamp-equipped wire harness comprising:
the clamp according to claim 1; and
the wire harness held by the holding portion.

10. The clamp-equipped wire harness according to claim 9,
wherein the wire harness includes:
a wire,
an outer cover in which the wire is accommodated and whose outer circumference is enclosed by the holding portion,
a spacer provided in an internal space of the outer cover in a portion enclosed by the holding portion, and
the spacer is formed so as to fill a space between an outer circumferential surface of the wire and an inner circumferential surface of the outer cover.

* * * * *